Patented Apr. 23, 1935

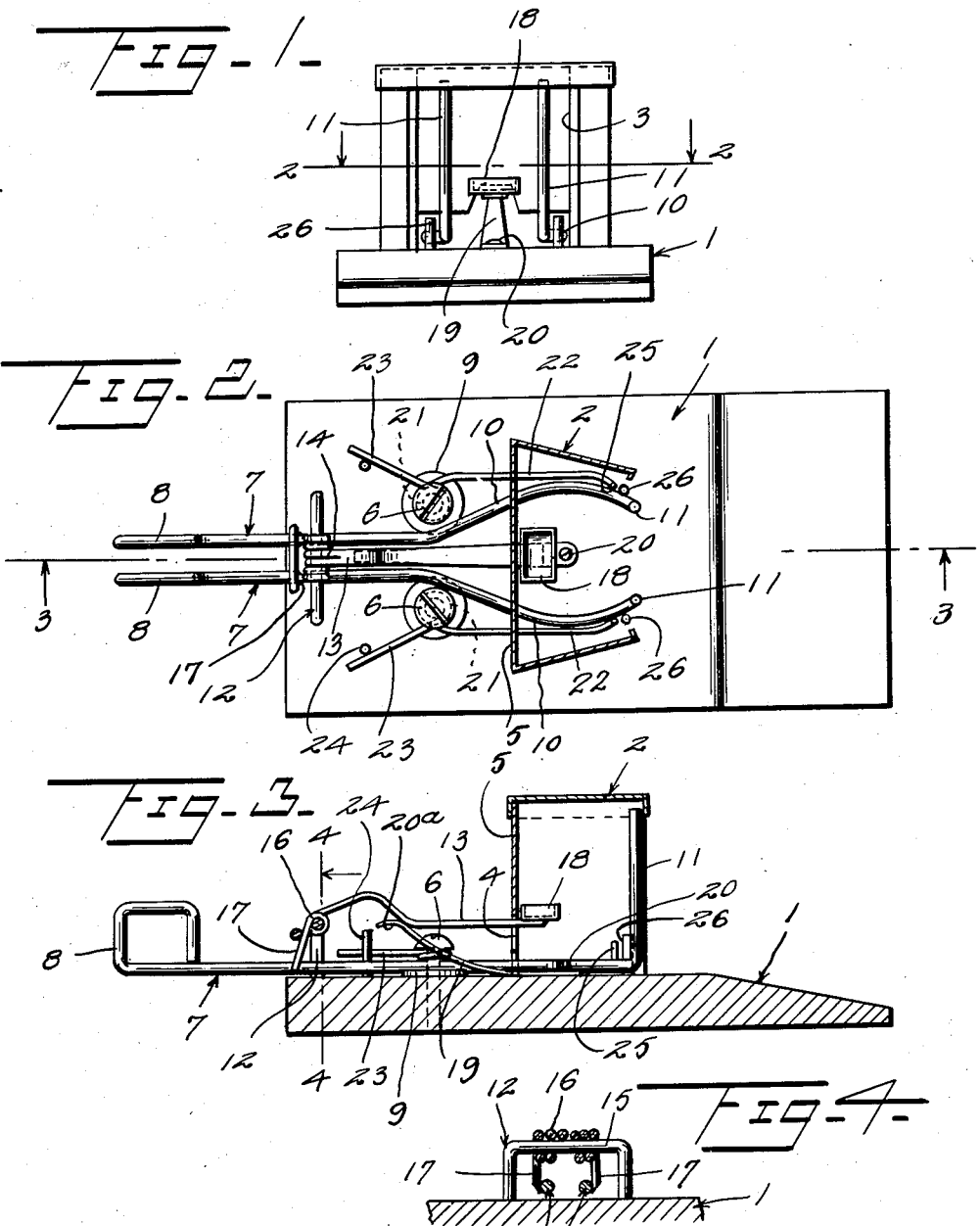

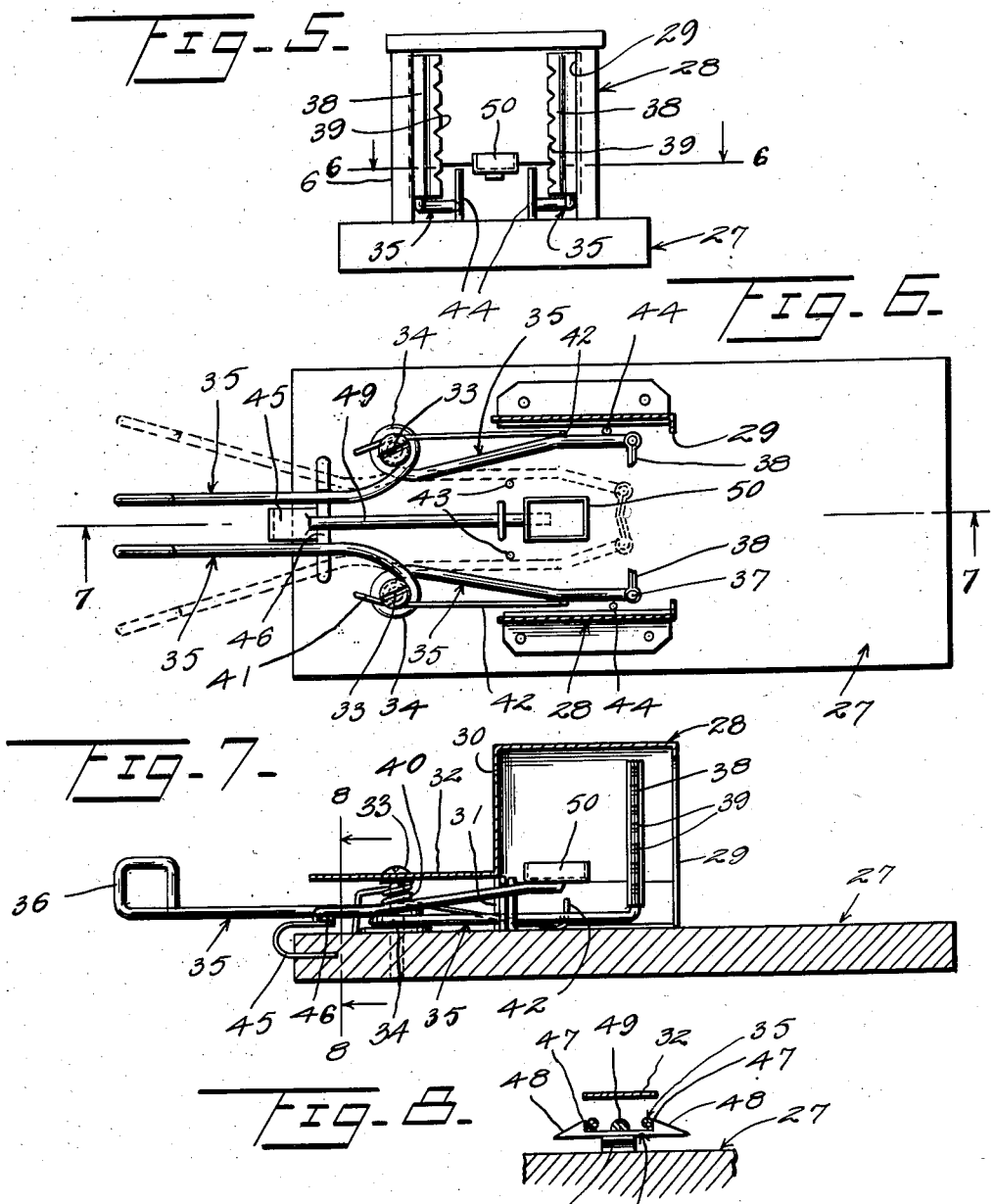

1,998,521

UNITED STATES PATENT OFFICE 1,998,521

MOUSE TRAP

Jesse G. Pickering, Jr., Clarksville, Tenn.

Application March 2, 1933, Serial No. 659,377
Renewed October 4, 1934

13 Claims. (Cl. 43—85)

This invention relates to improvements in traps and pertains particularly to improvements in mouse traps.

The primary object of the present invention is to provide a mouse trap which may be set and emptied or released to remove therefrom a captured animal, without having to touch any of the parts of the trap which come into contact with the animal's body, thereby making the device sanitary insofar as contamination of the person setting the same is concerned.

Another object of the invention is to provide a trap having a novel means for effecting the setting of the jaws thereof.

Still another object of the invention is to provide a trap having novel means for automatically setting the trigger when the jaws have been separated, without it being necessary for the user of the trap to touch the jaws or the trigger.

Another object of the invention is to provide a mouse trap which is so designed that house pets cannot become caught thereby.

Other objects and advantages of the present invention will become apparent as the description of the same proceeds and the invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in front elevation of the preferred form of the present invention;

Figure 2 is a horizontal sectional view taken substantially upon the line 2—2 of Figure 1;

Figure 3 is a vertical sectional view taken substantially upon the line 3—3 of Figure 2;

Figure 4 is a transverse sectional view taken on the line 4—4 of Figure 3;

Figure 5 is a view in front elevation of a modified form of the trap;

Figure 6 is a horizontal sectional view taken substantially upon the line 6—6 of Figure 5;

Figure 7 is a vertical sectional view taken substantially upon the line 7—7 of Figure 6;

Figure 8 is a sectional view taken substantially upon the line 8—8 of Figure 7.

Referring now more particularly to the drawings wherein like numerals of reference indicate corresponding parts throughout the several views, the numeral 1 indicates generally the base portion of the preferred form of the present trap, which form will be first described in its entirety before describing the modified form. This base 1 is preferably of wood, although it may be formed of metal if desired, and upon the top thereof there is mounted the small housing 2 which has a front opening 3 and an opening 4 in the back wall 5 thereof. The front opening 3, is as shown, substantially the full height of the housing, whereas the back wall opening 4 is relatively small as it is provided only for the extension into the housing of certain of the parts of the trap.

Secured to the base 1 at the rear of the housing 3 are the two posts 6 which are spaced apart transversely of the base.

Extending longitudinally of the base are the two bars 7 which have their rear ends projecting beyond the rear edge of the base as shown in Figures 2 and 3 where they terminate in the handle portions 8 while at their forward ends they are formed to provide the eyes 9 through which the posts 6 pass. From the points where the eyes 9 are formed the arms are continued forwardly in outwardly diverging relation as indicated at 10, passing through the opening 4 to the interior of the housing 2 where they are curved back into convergent relation and terminate in the vertically disposed jaw portions 11. The eyes 9 may, if desired, be formed integral with the arms by twisting the arms into the desired form or the arms may be continued directly into the divergent portions 10 and have separate eye pieces attached thereto.

At the rear of the base 1 there is secured the relatively broad staple 12 which straddles the arms 7 as shown in Figure 4 and which serves as a trigger support in the manner about to be described.

Extending longitudinally of the trap base is a trigger arm 13 which at its forward end passes through the opening 4 where it terminates within the housing 2, while the rear end is split as indicated at 14 and each of the two portions thus formed is loosely wrapped about the horizontal bar portion 15 of the staple 12 to form a hinge connection therewith as indicated at 16. The terminals of the two portions of the trigger arm are extended downwardly to form the trigger fingers 17 which, when the trap is in set position, engage opposite sides of the jaw actuating bars 7 to retain the same in the parallel set position in which they are shown in Figure 2. When the trap is set and the trigger fingers 17 engage the jaw bars 7 the trigger arm 13 will be substantially horizontal as shown in Figure 3 and when the trap is sprung this arm will be oscillated so as to rock the portions 16 thereof and thus swing upwardly the free lower ends of the trigger fingers 17 to positions where the bars 7 will be released.

At the forward end the trigger arm 13 carries a bait pan 18 in which suitable bait is placed for enticing the animals into the trap.

Secured to the base 1 beneath and extending longitudinally of the trigger arm 13 is the trigger actuating spring 19. This spring is in the form of a flat tongue which has one end attached to the base at the point 20 while the other end curves upwardly beneath and engages the under side of the trigger arm 13 as indicated at 20ᵃ, thus normally urging the free or pan carrying end of the arm upwardly and consequently making it possible to set the trap merely by forcing together the handle ends 8 of the bars 7 whereby the bars will slip under the free ends of the trigger fingers 17 and these will be forced down into set position by the spring 19 as will be readily understood.

Surrounding each of the pivot posts 6 about which the jaw bars 7 oscillate, are the springs 21. Each of these springs has the relatively long terminal portions 22 and 23. The portions or ends 23 of the springs 21 are held against movement in one direction by the pins 24 which are carried by the base while the other ends or portions of the springs extend forwardly through the opening 4 into the interior of the housing 2 and bear against the outer sides of the adjacent portions of the jaw bars as shown in Figure 2 at 25.

The outward or separating movement of the jaw bars is limited at the forward ends thereof by the pins 26 which are mounted in the base 1 within the opening 3 of the housing.

From the foregoing description it will be readily apparent that in order to set the present trap it is merely necessary to grasp the outer ends or handle portions 8 of the jaw bars 7 and force the same together. This will result in the separation of the jaws in the entrance opening 3 of the housing, against the tension of the springs 21. As the portions of the bars 7 adjacent the trigger fingers 17 are moved together they will be forced under the ends of the trigger fingers causing the latter to oscillate upwardly and forcing the arm 13 downwardly against the spring 19. As soon as the bars 7 are located in the area between the the fingers 17 the spring 19 will react to force the arm 13 up and thus lower the ends of the trigger fingers so as to retain the jaw bars in the set position in which they are shown in Figure 2. It will thus be apparent that when the animal extends its head through the opening 3 to reach bait placed in the pan 18, its neck will be positioned between the jaws 11 and when the trigger arm 13 is forced downwardly in the attempt of the animal to get the bait therefrom the jaw bars 7 will be released and the jaws will be forced together by the springs 21 so as to secure the animal therebetween. It will also be apparent that after the animal has been caught it may be removed from the trap without having to be touched, by picking up the trap by means of the handle portions 8 and releasing the animal by forcing these portions together so as to open the jaws. This will result at the same time in the resetting of the trap so that these parts with which the animal has come into contact need not be touched.

Figures 5 to 8 inclusive illustrate a modified form of the present invention. In this form there is employed, as in the preferred form, a base which is indicated by the numeral 27 upon which is mounted a housing which is indicated generally by the numeral 28.

This housing has the front opening 29, and the back wall 30 is provided with a small opening at the lower part thereof as indicated at 31 and from the upper edge of this small opening 31 there extends rearwardly from the housing the shield 32 which covers certain of the moving parts of the trap.

Rearwardly of the housing 28 are mounted in the base the two posts 33 which are upon the opposite side of the longitudinal center of the trap and these posts pass through the eye portions 34 of the jaw bars 35. As shown these eyes are integral with the bars 35, being formed by bending the bars in the proper manner. It will, of course, be apparent that other means may be employed for oscillatably mounting the bars, therefore, it is to be understood that the invention is not to be limited to the particular form here illustrated.

The bars 35 extend rearwardly from the posts 34 beyond the rear end of the base 27 and terminate in the handles 36 while the forward ends pass through the opening 31 into the housing 28 and terminate in the upstanding jaws 37 which in the present form of the invention carry the opposing flanges 38 which are toothed as indicated at 39 in Figure 5. These toothed edges of the flanges 38 come together when the trap is sprung.

The jaws of the trap are actuated by springs 40 which surround the posts 33 and each of these springs has one end secured to the base 27 as indicated at 41 while its other end extends forwardly through the opening 31 and engages against the outside of a jaw bar 35 as shown in Figure 6. These forwardly extending arms 42 of the springs 40 normally force the bars 35 together.

Disposed between the forward ends of the jaw bars 35 are pins 43 which operate to limit the inward movement of the bars and the outward movement thereof is limited by pins 44 which are placed within the casing 28 adjacent the opening 29 as shown in Figure 6.

At the rear end of the base 27 there is secured one end of a flat spring 45, the other end of which overlies the base 27 and has secured transversely thereof the trigger bar 46 which adjacent each end is formed to provide a point 47 and is tapered off from this point to the adjacent end to provide the inclined surface 48 over which a jaw bar rides when it is oscillated to set position.

Secured to this trigger bar 46 between the points 47 is one end of the trigger arm 49 which extends forwardly longitudinally of the base 27 through the opening 31 to the interior of the housing 28 where it carries upon its other end the bait pan 50.

The free end of the spring 45 normally urges the trigger bar 46 and the trigger arm 49 upwardly and from this it will be readily understood that when the rear ends of the jaw bars 35 are forced together so as to separate the jaws 37, these bars will ride over the inclined surfaces 48 of the trigger bar and pass the points 47 whereupon the previously depressed spring 45 will be permitted to move upwardly and raise the arm 49 so that the bars 35 will be caught and held between the points 47 as shown in Figure 8.

The trap will thus be held in set position and it will be apparent that when an animal attempts to remove bait form the pan 50 and causes the latter to be depressed the trigger bar 46 will be lowered so as to release the bars 35 and thus allow the springs 40 to exert their influence to drive the jaws together.

Having thus described the invention, what is claimed is:—

1. An animal trap, comprising a base, a pair of bar members pivotally attached intermediate their ends to the base for relative movement at their ends, jaw members carried by and at adjacent ends of the bars, the opposite ends of said bars constituting means for effecting the shifting of the jaw carrying ends, resilient means normally urging the jaws together, bait carrying means, and a spring actuated latch connected with said bait carrying means and adapted to engage and hold both of said bars in a predetermined position when the trap is set.

2. A trap of the character described, comprising a base, a pair of bar members each mounted intermediate its ends for oscillation upon said base, a jaw member at one end of each of said bars, spring means controlling the jaw carrying ends of the bars whereby the latter will be normally urged together, the opposite ends of said bars constituting handles for the separation of said jaws, bait carrying means, resilient means normally urging said bait carrying means to movement in one direction, and a pair of trigger elements carried by the bait carrying means and normally urged toward said bars whereby the oscillation of the bars to a position where said jaws will be separated will cause the automatic engagement of the triggers therewith.

3. A trap of the character described, comprising a base body, a pair of bar members each pivotally mounted intermediate its ends upon said base, a jaw carried at one end of each of said bars, resilient means normally urging the jaw carrying ends of the bars together whereby said jaws will coact for the trapping of an animal, the opposite ends of said bars being formed to provide handles to facilitate the separating of the jaws, a housing enclosing said jaws and having an entrance opening upon opposite sides of which the jaws position when set, an oscillatably mounted trigger arm having one end disposed within the housing and adapted to carry a bait, resilient means normally urging the bait carrying end of the trigger arm upwardly, and a pair of trigger fingers carried by the bait carrying arm at its other end and adapted to engage the outer sides of the bars when the jaws are in set relation.

4. An animal trap, comprising a base, a pair of bar members each oscillatably connected intermediate its ends with the base, jaw members formed upon adjacent ends of the bars, resilient means controlling the swinging of the bars whereby the jaws will be normally urged together, a bar member disposed transversely of the first-mentioned bars and formed adjacent its ends to provide trigger points between which the bars are held when the jaws are in spaced relation, resilient means normally urging said transverse bar toward the first-mentioned bars, and bait carrying means connected with said transverse bar and operating when shifted in one direction to move the trigger points away from the first-mentioned bars for the release of the latter.

5. An animal trap, comprising a base, a pair of bar members each oscillatably connected intermediate its ends with the base, jaw members formed upon adjacent ends of the bars, resilient means controlling the swinging of the bars whereby the jaws will be normally urged together, a bar member disposed transversely of the first-mentioned bars and formed adjacent its ends to provide trigger points between which the bars are held when the jaws are in spaced relation, resilient means normally urging said transverse bar toward the first-mentioned bars, and bait carrying means connected with said transverse bar and operating when shifted in one direction to move the trigger points away from the first-mentioned bars for the release of the latter, said bars having the ends opposite the jaws formed to provide handles whereby the bars may be shifted.

6. An animal trap, comprising a base, a pair of bar members each pivotally mounted intermediate its ends upon the base, a jaw element carried by the bars at adjacent ends, resilient means normally urging said jaw carrying ends of the bars together, a trigger bar disposed transversely of the first mentioned bars upon the under sides thereof, said trigger bar having an inwardly extending upwardly inclined surface at each end over which a jaw bar is adapted to ride and terminating in a point against which the jaw bar engages when the trap is set, spring means normally urging said trigger bar upwardly against the jaw bars, a trigger arm connected at one end with said trigger bar, and bait holding means upon the other end of the trigger arm.

7. An animal trap, comprising a base, a pair of arms pivotally mounted on the base for relative movement between their ends, jaws carried by adjacent ends of the arms, oscillatable means for engaging and simultaneously holding the arms to maintain said jaws separated, said means being entirely free of connection with the arms when the jaws are together, bait carrying means carried by the oscillatable means, and resilient means normally urging the jaws together.

8. An animal trap comprising a base, a pair of arms pivotally mounted on the base for relative movement between their ends, jaws carried by adjacent ends of the arms, an oscillatably mounted trigger unit disposed transversely of said arms and including means adapted to simultaneously engage and hold the arms with said jaws separated, said trigger means being free of connection with the arms when the jaws are together, bait carrying means connected with the trigger unit, and resilient means normally urging the jaws together.

9. A trap comprising a base, a pair of elongated members pivotally mounted in side by side relation upon the base for relative movement between two adjacent ends thereof, jaws carried by said ends, resilient means normally urging the jaws together, a trigger unit comprising a body extending transversely of said members and including means for engaging and holding the members with the jaws in spaced relation, said trigger unit being movably mounted whereby the said means is permitted to engage said elongated members, resilient means controlling the trigger unit whereby movement of the members for the opening of the jaws will cause the member engaging means of the unit to automatically engage and hold the members in set position, and a bait carrier connected with said unit.

10. A trap, comprising a pair of elongated arms each having a terminal upstanding portion, said terminal portions constituting jaws, means intermediate the ends of the arms for pivotally securing the same whereby the jaws may have relative movement, said arms being bent adjacent the pivotal securing means and disposed in divergent relation toward the jaw ends, means at the opposite ends of the arms facilitating grasping and oscillation thereof, resilient means normally urging the oscillation of the arms to bring said jaws together, a horizontal pivot disposed across said arms between the pivot points and the handle ends thereof, an arm secured to the horizontal pivot and extending forwardly toward said jaws and a pair of spaced depending trigger fingers secured to said horizontal pivot and adapted to have the arms caught therebetween and adjacent the lower ends thereof, and resilient means normally urging said bait arm and fingers to oscillate in one direction.

11. A trap, comprising a pair of elongated arms each having a terminal upstanding portion, said terminal portions constituting jaws, means intermediate the ends of the arms for pivotally securing the same whereby the jaws may have relative movement, said arms being bent adjacent the pivotal securing means and disposed in divergent relation toward the jaw ends, means at the opposite ends of the arms facilitating grasping and oscillation thereof, resilient means normally urging the oscillation of the arms to bring said jaws together, a horizontal pivot disposed across said arms between the pivot points and the handle ends thereof, an arm secured to the horizontal pivot and extending forwardly toward said jaws and a pair of spaced depending trigger fingers secured to said horizontal pivot and adapted to have the arms caught therebetween and adjasent the lower ends thereof, and resilient means normally urging said bait arm and fingers to oscillate in one direction, said bait fingers at their free ends having outwardly facing bevels whereby said arms when swung together at the handle ends will raise and pass beneath the fingers.

12. A trap, comprising a pair of vertical pivots, a pair of arms each oscillatably mounted intermediate its ends upon a pivot, each of said arms being formed at one end to provide a jaw coacting with the jaw of the other arm, the other end of each arm being formed to provide a handle facilitating the relative movement of the jaws, resilient means normally urging said jaws together, a substantially U-frame disposed in inverted position over said arms between said pivots and the handle ends thereof and limiting the separatory movement of the arm, a member oscillatably mounted upon said frame above the arms, a pair of trigger fingers carried by and extending downwardly from said member in a direction transversely to the arms, said arms being designed to position between the fingers in engagement therewith when the jaws are separated, a bait arm connected at one end with said member and extending forwardly toward said jaws, and resilient means normally urging said bait arm to swing upwardly.

13. A trap, comprising a pair of vertical pivots, a pair of arms each oscillatably connected intermediate its ends to a pivot, means at adjacent ends of the arms to form coacting jaws, means at the opposite ends of the arms forming handles by which the arms may be oscillated, resilient means normally urging said jaws together, a spring member mounted in a plane extending vertically between the arms and having an end normally tending to move upwardly, a bar carried by the said end of said spring and disposed across and beneath said arms between the pivots and the handles, a pair of trigger points carried by said bar and adapted to have said arms engaged therewith when the jaws are separated, and a bait arm secured at one end to the said end of the spring and having its other end directed forwardly toward said jaws.

JESSE G. PICKERING, Jr.